(12) United States Patent
Liao et al.

(10) Patent No.: US 12,332,528 B2
(45) Date of Patent: Jun. 17, 2025

(54) CHOLESTEROL LIQUID CRYSTAL DISPLAY DEVICE

(71) Applicant: IRIS OPTRONICS CO., LTD., Tainan (TW)

(72) Inventors: Chi-Chang Liao, Tainan (TW); Wu-Chang Yang, Tainan (TW)

(73) Assignee: IRIS OPTRONICS CO., LTD., Tainan (TW)

( * ) Notice: Subject to any disclaimer, the term of this patent is extended or adjusted under 35 U.S.C. 154(b) by 0 days.

(21) Appl. No.: 18/487,040

(22) Filed: Oct. 13, 2023

(65) Prior Publication Data
US 2024/0126127 A1    Apr. 18, 2024

(30) Foreign Application Priority Data
Oct. 14, 2022  (TW) .................................. 111138975

(51) Int. Cl.
*G02F 1/1368*   (2006.01)
*G02F 1/1343*   (2006.01)
*G02F 1/1362*   (2006.01)
*G02F 1/137*    (2006.01)

(52) U.S. Cl.
CPC ...... *G02F 1/1368* (2013.01); *G02F 1/134309* (2013.01); *G02F 1/136209* (2013.01); *G02F 1/136222* (2021.01); *G02F 1/137* (2013.01)

(58) Field of Classification Search
CPC ............. G02F 1/1368; G02F 1/134309; G02F 1/136209; G02F 1/136222; G02F 1/137; G02F 1/1347
See application file for complete search history.

(56) References Cited

U.S. PATENT DOCUMENTS

| 6,423,614 B1 * | 7/2002 | Doyle ............... H01L 21/76254 257/E21.703 |
| 2005/0036088 A1 * | 2/2005 | Okumura .......... G02F 1/133371 349/114 |

(Continued)

FOREIGN PATENT DOCUMENTS

| CN | 202066422 | * | 5/2008 | ............. G02F 1/155 |
| CN | 115561943 A | * | 1/2023 | ............. G02F 1/155 |

*Primary Examiner* — Mariam Qureshi
(74) *Attorney, Agent, or Firm* — Cheng-Ju Chiang

(57) ABSTRACT

A cholesteric liquid crystal display device includes a first substrate, a second substrate, a third substrate, a first cholesteric liquid crystal layer, a second cholesteric liquid crystal layer, a first common electrode pattern layer, a second common electrode pattern layer, and a first TFT circuit pattern layer and the second TFT circuit pattern layer. The first cholesteric liquid crystal layer is disposed between the first substrate and the second substrate. The second cholesteric liquid crystal layer is disposed between the second substrate and the third substrate. The first common electrode pattern layer is disposed on the first substrate. The second common electrode pattern layer is disposed on the third substrate. The first TFT circuit pattern layer and the second TFT circuit pattern layer are respectively disposed on two opposite surfaces of the second substrate. The first TFT circuit pattern layer and the second TFT circuit pattern layer are arranged correspondingly. As a result, alignment can be accomplished without the use of high-precision equipment.

10 Claims, 3 Drawing Sheets

(56) References Cited

U.S. PATENT DOCUMENTS

| | | | | |
|---|---|---|---|---|
| 2005/0270449 A1* | 12/2005 | Koma | ............... | G02F 1/133555 349/114 |
| 2007/0258023 A1* | 11/2007 | Huang | ................. | G02F 1/1347 349/74 |
| 2010/0214515 A1* | 8/2010 | Hsieh | ................. | G02F 1/13476 349/113 |
| 2011/0019129 A1* | 1/2011 | Nishizawa | ........ | G02F 1/133308 349/64 |
| 2012/0293741 A1* | 11/2012 | Gu | ........................... | G09G 3/36 349/190 |
| 2017/0108726 A1* | 4/2017 | Yanai | ................. | G02F 1/13362 |
| 2023/0004032 A1* | 1/2023 | Kuo | ................. | G02F 1/134309 |

* cited by examiner

CHOLESTEROL LIQUID CRYSTAL DISPLAY DEVICE

BACKGROUND OF THE INVENTION

1. Field of the Invention

The present invention relates to a display device, and in particular to a cholesteric liquid crystal display device.

2. Description of Related Art

Today's cholesteric liquid crystal display devices, whether in the form of Passive Matrix or Active Matrix driving schemes, face the challenge of aligning and laminating at least two layers of cholesteric liquid crystal layers with two colors in precise fashion. If the cholesteric liquid crystal layers with two colors are not perfectly aligned, color mixing can occur, resulting in blurred image quality. Achieving such high-precision alignment necessitates advanced equipment, leading to increased equipment investment costs. As display resolutions continue to rise, the corresponding manufacturing processes become increasingly complex.

Therefore, the primary objective of the present invention is to provide a solution to the aforementioned issues in cholesteric liquid crystal display devices.

SUMMARY OF THE INVENTION

The objective of the present invention is to provide a cholesteric liquid crystal display device. In this cholesteric liquid crystal display device, a double-sided Thin Film Transistor (TFT) structure on the same substrate eliminates the need for precise alignment, as TFTs can be integrated on both sides of the same substrate. The alignment of two-color pixels is accomplished during the lithography etching stage, eliminating the necessity for additional alignment steps with high-precision equipment.

To achieve at least one of the advantages mentioned above, or to obtain other advantages, an embodiment of the present invention provides a cholesteric liquid crystal display device, which comprises a first substrate, a second substrate, a third substrate, a first cholesteric liquid crystal layer, a second cholesteric liquid crystal layer, a first common electrode pattern layer, a second common electrode pattern layer, a first TFT circuit pattern layer, and a second TFT circuit pattern layer.

The first substrate has a first surface and a second surface corresponding to the first surface. The second substrate has a third surface and a fourth surface corresponding to the third surface, and the third substrate has a fifth surface and a sixth surface corresponding to the fifth surface. The first cholesteric liquid crystal layer is disposed between the first substrate and the second substrate, while the second cholesteric liquid crystal layer is positioned between the second substrate and the third substrate. Additionally, the first common electrode pattern layer is provided on the second surface of the first substrate, and the second common electrode pattern layer is implemented on the fifth surface of the third substrate. Furthermore, the first TFT circuit pattern layer is disposed on the third surface of the second substrate, and the second TFT circuit pattern layer is disposed on the fourth surface of the second substrate. It's important to note that the first TFT circuit pattern layer and the second TFT circuit pattern layer are implemented in a corresponding manner.

In some embodiments, the cholesteric liquid crystal display device further comprises a fourth substrate, a third cholesteric liquid crystal layer, a third common electrode pattern layer, and a third TFT circuit pattern layer. The fourth substrate has a seventh surface and an eighth surface corresponding to the seventh surface. The third cholesteric liquid crystal layer is disposed between the third substrate and the fourth substrate. The third common electrode pattern layer is implemented on the seventh surface of the fourth substrate, and the third TFT circuit pattern layer is positioned on the sixth surface of the third substrate. In some embodiments, the third common electrode pattern layer may be provided on the sixth surface of the third substrate, and the third TFT circuit pattern layer may be positioned on the seventh surface of the fourth substrate.

In some embodiments, the cholesteric liquid crystal display device further comprises a first color filter layer disposed on the second substrate.

In some embodiments, the cholesteric liquid crystal display device further comprises a second color filter layer disposed on the third substrate.

In some embodiments, the cholesteric liquid crystal display device further comprises a black absorption layer disposed on the first surface of the first substrate.

In some embodiments, the cholesteric liquid crystal display device further comprises a first cover layer for covering the first common electrode pattern layer.

In some embodiments, the cholesteric liquid crystal display device further comprises a second cover layer for covering the second common electrode pattern layer.

Therefore, by utilizing the cholesteric liquid crystal display device provided by the present invention, the first TFT circuit pattern layer is implemented on the third surface, and the second TFT circuit pattern layer is implemented on the fourth surface of the second substrate. This eliminates the need for high-precision equipment to align the two TFT circuit pattern layers separately. Since both TFT circuit pattern layers are on opposite sides of the same substrate, the two-color alignment can be completed during the lithography etching stage. Additional alignment steps with high-precision equipment are unnecessary, resulting in improved image quality and reduced production costs.

The aforementioned illustrations are exemplary for the purpose of further explaining the scope of the present invention. Other objectives and advantages related to the present invention will be illustrated in the subsequent descriptions and appended drawings.

BRIEF DESCRIPTION OF THE DRAWINGS

The foregoing features of the present invention may be combined with the following drawings in various combinations without exclusivity, unless expressly indicated otherwise. Apparently, descriptions of drawings in the following may be some of embodiments of the present invention, those of ordinary skill in the art may derive other drawings based on the following drawings without unduly experiments.

DETAILED DESCRIPTION OF THE PREFERRED EMBODIMENTS

The aforementioned constructions and associated functions and following detailed descriptions are exemplary for the purpose of further explaining the scope of the present invention. Other objectives and advantages related to the present invention will be illustrated in the subsequent descriptions and appended drawings. Furthermore, the present invention may be embodied in various modifications, and descriptions and illustrations are not-limiting.

It should be understood that the term used herein in embodiments to describe direction in terms of "central", "lateral", "up", "down", "right", "left", "upright", "horizontal", "top", "bottom", "inside", and "outside" are used to illustrate the present invention and for clarity. It does not hint or imply that device or part mentioned should be assembled or operated in specific direction or setting. Thus, the terms used herein to describe direction are not limiting. In addition, terms "first", and "second" is for descriptive purpose, and is not construed to or implies amount as described in technical feature of the present invention. Technical features with limitation terms "first" or "second" would illustrate or imply that one or more technical features can be included. As to detailed description of the present invention, the term "more" indicates two or more unless expressly indicated otherwise.

As to detailed descriptions of the present invention, it will be further explained that the term "assemble", "connected to", "connected" should be construed in broadest way, unless the context clearly indicates otherwise. For example, the term "connected" indicates that two parts may be "fixed connected" or "detachably connected" or "integrally connected". Similarly, the term "connected" also indicates that two parts may be "mechanically connected" or "electrically connected", and "directly connected", "connected by intermediate part" or "internally connected by two parts". Alterations or modifications of the terms mentioned above will be no doubt understood and obvious to those of ordinary skill in the art.

The terminology used herein is for the purpose of describing embodiments only and is not intended to limit the full scope of the present invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, or components and the like, but do not preclude the presence or addition of one or more other features, integers, steps, operations, elements, components, and/or groups thereof.

Figure 1:
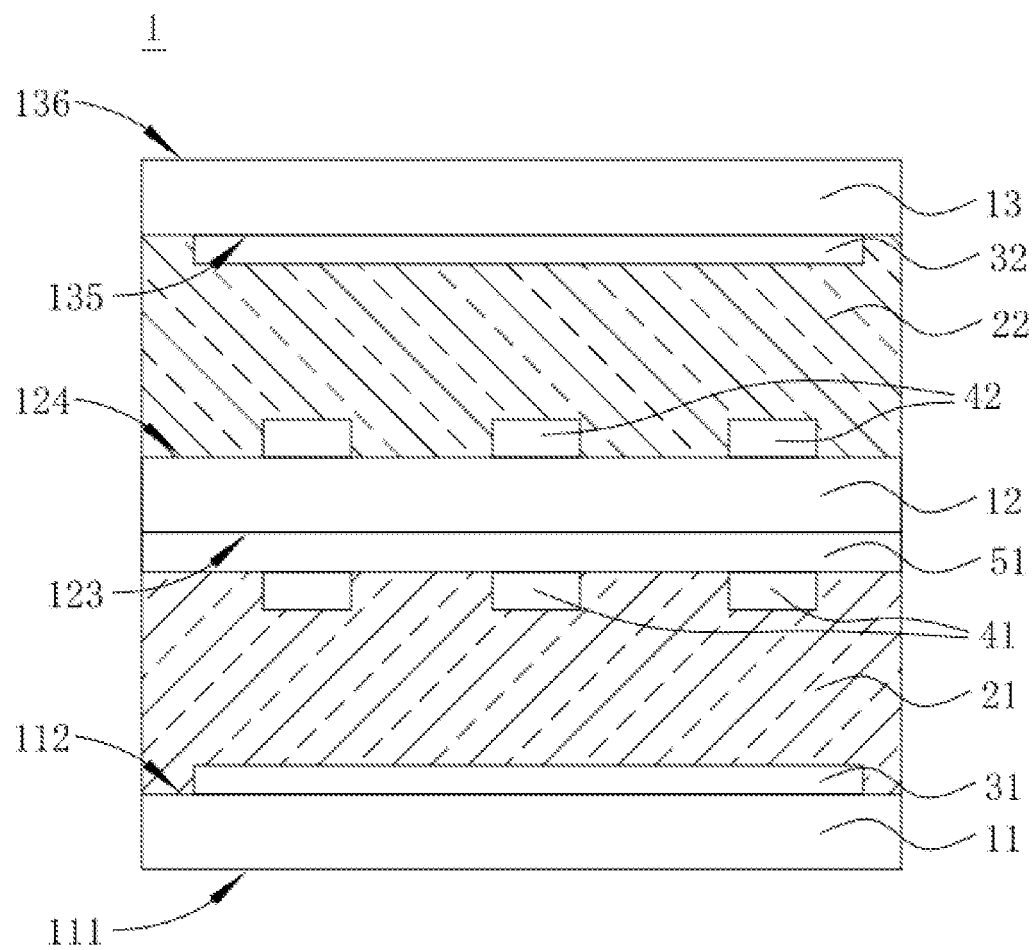
FIG. 1 is a schematic of a cholesteric liquid crystal display device according to an embodiment of the present invention.

Please refer to FIG. 1, which illustrate a schematic of a cholesteric liquid crystal display device 1 according to an embodiment of the present invention. In order to achieve at least one of the above advantages or other advantages, an embodiment of the present invention provides a cholesteric liquid crystal display device 1. The cholesteric liquid crystal display device 1 may comprise a first substrate 11, a second substrate 12, a third substrate 13, a first cholesteric liquid crystal layer 21, a second cholesteric liquid crystal layer 22, a first common electrode pattern layer 31, and a second common electrode pattern layer 32, the first TFT circuit pattern layer 41 and the second TFT circuit pattern layer 42.

The first substrate 11 has a first surface 111 and a second surface 112 corresponding to the first surface 111. The second substrate 12 has a third surface 123 and a fourth surface 124 corresponding to the third surface 123. The third substrate 13 has a fifth surface 135 and a sixth surface 136 corresponding to the fifth surface 135. In this embodiment, the first surface 111, the third surface 123, and the fifth surface 135 serve as the lower surfaces of each substrate, while the second surface 112, the fourth surface 124, and the sixth surface 136 function as the upper surfaces of each substrate.

The first cholesteric liquid crystal layer 21 is positioned between the first substrate 11 and the second substrate 12. It is utilized to produce the first color light. More specifically, by applying a voltage to the first cholesteric liquid crystal layer 21, the arrangement of its cholesteric liquid crystal molecules can be altered. This alteration causes the first cholesteric liquid crystal layer 21 to generate the first color light, which means it reflects the incident light as the first color light.

The second cholesteric liquid crystal layer 22 is positioned between the second substrate 12 and the third substrate 13. Its purpose is to produce the second color light. Specifically, by applying a voltage to the second cholesteric liquid crystal layer 22, the arrangement of its cholesteric liquid crystal molecules is modified, causing the second cholesteric liquid crystal layer 22 to generate the second color light by reflecting the incident light. It's worth noting that the first color light differs from the second color light.

The first common electrode pattern layer 31 is disposed on the second surface 112 of the first substrate 11, while the second common electrode pattern layer 32 is positioned on the fifth surface 135 of the third substrate 13. The purpose of the first common electrode pattern layer 31 is to apply voltage to the first cholesteric liquid crystal layer 21, whereas the second common electrode pattern layer 32 is utilized to apply voltage to the second cholesteric liquid crystal layer 22.

The first TFT circuit pattern layer 41 is provided on the third surface 123 of the second substrate 12, while the second TFT circuit pattern layer 42 is positioned on the fourth surface 124 of the second substrate 12. Furthermore, the first TFT circuit pattern layer 41 and the second TFT circuit pattern layer 42 are aligned correspondingly. By directly implementing a double-sided TFT circuit pattern layer structure on the second substrate 12, the traditional precision alignment step can be omitted. This is because alignment of both of the first TFT circuit pattern layer 41 and the second TFT circuit pattern layer 42 are simultaneously completed when aligning the upper and lower surfaces of the second substrate 12 during the lithography etching stage. As a result, there is no need for additional high-precision equipment for alignment steps.

In some embodiments, as illustrated in FIG. 1, the cholesteric liquid crystal display device 1 further comprises a first color filter layer 51. This first color filter layer 51 is positioned on the second substrate 12. It can be provided either on the third surface 123 or the fourth surface 124 of the second substrate 12. The primary function of the first color filter layer 51 is to filter light of the same color as the first color light. As also shown in FIG. 1, the first color filter layer 51 is disposed on the third surface 123 of the second substrate 12, and resides between the second substrate 12 and the first TFT circuit pattern layer 41.

Figure 2:
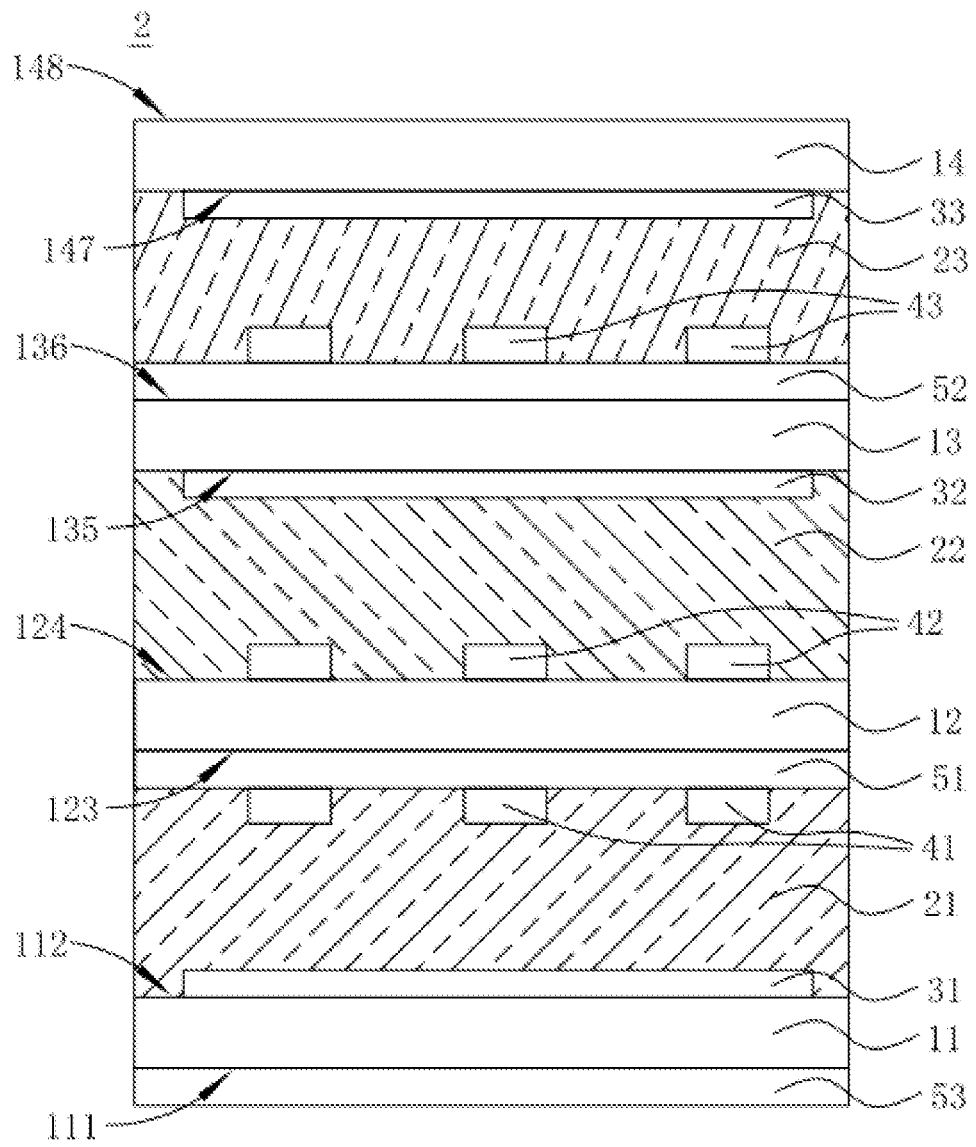
FIG. 2 is a schematic of a cholesteric liquid crystal display device according to another embodiment of the present invention.

In some embodiments, as depicted in FIG. 2, this cholesteric liquid crystal display device 2 may also comprise a fourth substrate 14, a third cholesteric liquid crystal layer 23, a third common electrode pattern layer 33, and a third TFT circuit pattern layer 43. The fourth substrate 14 has a seventh surface 147 and an eighth surface 148 corresponding to the seventh surface 147. The seventh surface 147 and the eighth surface 148 may represent the lower and upper surfaces of the fourth substrate 14, respectively. The third cholesteric liquid crystal layer 23 is positioned between the third substrate 13 and the fourth substrate 14 and is responsible for generating a third color light. By applying voltage to the third cholesteric liquid crystal layer 23, the alignment of the cholesteric liquid crystal molecules changes, resulting in the generation of the third color light. This light reflects the second color light from the incident light. It's important to note that the first color light, the second color light, and the third color light are distinct from each other in terms of color.

Figure 3:
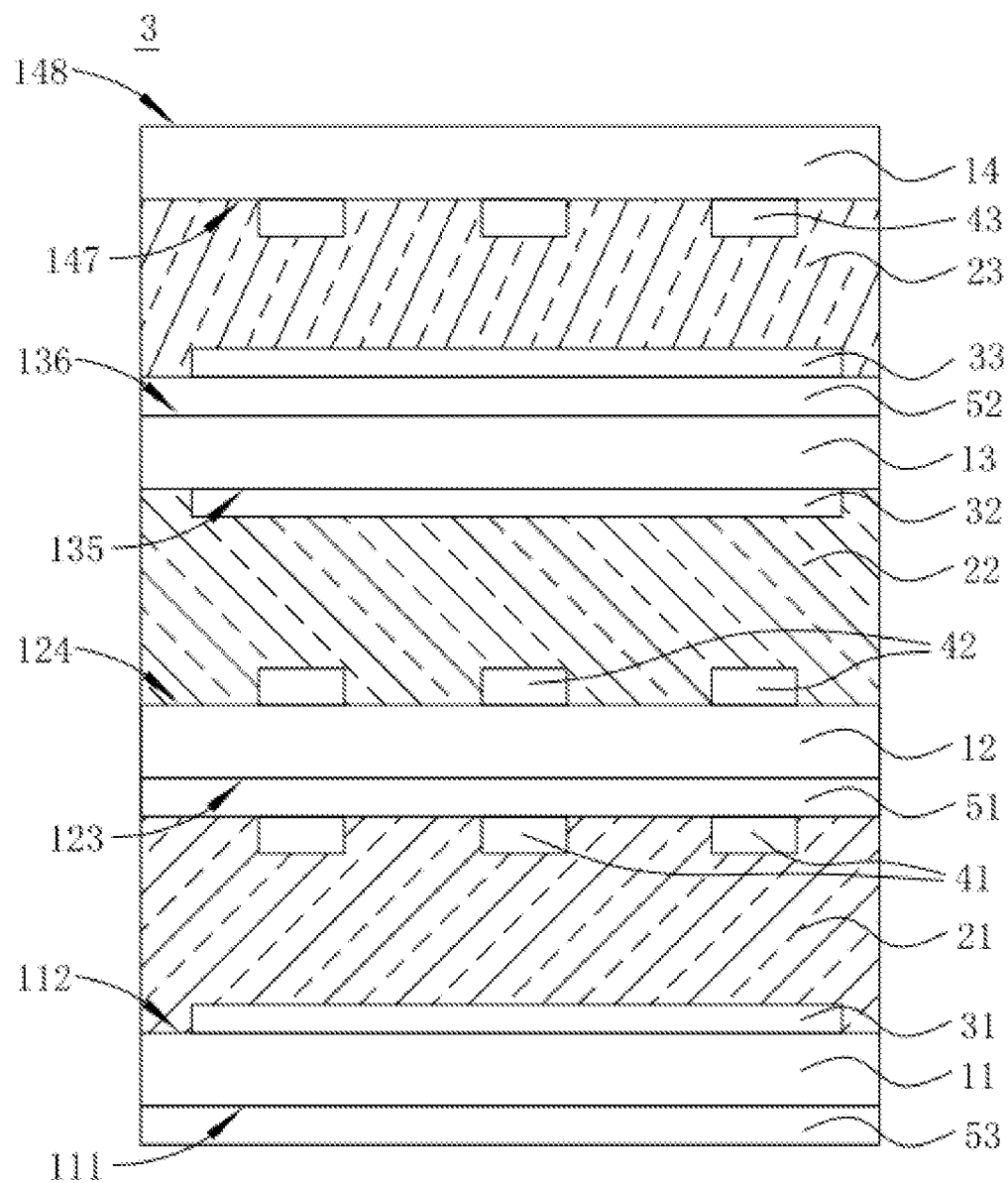
FIG. 3 is a schematic of a cholesteric liquid crystal display device according to another embodiment of the present invention.

In the embodiment, the third common electrode pattern layer 33 is implemented on the seventh surface 147 of the fourth substrate 14, and responsible for applying voltage to the third cholesteric liquid crystal layer 23. Meanwhile, the third TFT circuit pattern layer 43 is disposed on the sixth surface 136 of the third substrate 13. High-precision equipment is used to ensure alignment between the third TFT circuit pattern layer 43 and the second TFT circuit pattern layer 42. However, it's important to note that the present invention is not limited to this configuration. In other embodiments, such as the cholesteric liquid crystal display device 3 as shown in FIG. 3, the third TFT circuit pattern layer 43 may be implemented on the seventh surface 147 of the fourth substrate 14, while the third common electrode pattern layer 33 is provided on the sixth surface 136 of the third substrate 13.

In some embodiments, as illustrated in FIG. 2, the cholesteric liquid crystal display device 2 also comprises a second color filter layer 52. This second color filter layer 52 is disposed on the third substrate 13 and can be positioned on either the fifth surface 135 or the sixth surface 136 of the third substrate 13. Its primary function is to filter light of the same color as the second color light. As depicted in FIG. 2, the second color filter layer 52 is provided on the sixth surface 136 of the third substrate 13, and resides between the third substrate 13 and the third TFT circuit pattern layer 43.

In some embodiments, as depicted in FIG. 2, the cholesteric liquid crystal display device 2 includes a black absorption layer 53. The black absorption layer 53 is disposed on the first surface 111 of the first substrate 11 with the purpose of absorbing light to enable black image representation.

In certain embodiments, the cholesteric liquid crystal display device 2 may also comprise a first cover layer. This first cover layer serves the purpose of protecting the first common electrode pattern layer 31 and may be a PI (polyimide) cover layer.

In certain embodiments, the cholesteric liquid crystal display device 2 may also comprise a second cover layer. The second cover layer serves the purpose of protecting the second common electrode pattern layer 32 and may be a PI (polyimide) cover layer.

Furthermore, a PI cover layer can also be applied to cover both the first color filter layer 51 and the second color filter layer 52. The PI cover layer serves a dual role in providing protection and aiding in liquid crystal alignment.

Therefore, with the cholesteric liquid crystal display devices 1 and 2 provided by the present invention, the first TFT circuit pattern layer 41 and the second TFT circuit pattern layer 42 are positioned on the third surface 123 and the fourth surface 124 of the second substrate 12, respectively. Due to their placement on both sides of the same substrate and the concurrent alignment during the lithography etching stage, there is no need for high-precision equipment to ensure their alignment. This eliminates the necessity for additional alignment steps, ensuring image quality and reducing production costs.

The descriptions illustrated above set forth simply the preferred embodiments of the present invention; however, the characteristics of the present invention are by no means restricted thereto. All changes, alterations, or modifications conveniently considered by those skilled in the art are deemed to be encompassed within the scope of the present invention set forth by the following claims.

What is claimed is:

1. A cholesteric liquid crystal display device, comprising:
   a first substrate, having a first surface and a second surface corresponding to the first surface;
   a second substrate, having a third surface and a fourth surface corresponding to the third surface;
   a third substrate, having a fifth surface and a sixth surface corresponding to the fifth surface;
   a first cholesteric liquid crystal layer, disposed between the first substrate and the second substrate;
   a second cholesteric liquid crystal layer, disposed between the second substrate and the third substrate;
   a first common electrode pattern layer, implemented on the second surface of the first substrate;
   a second common electrode pattern layer, implemented on the fifth surface of the third substrate;
   a first TFT circuit pattern layer, implemented on the third surface of the second substrate; and
   a second TFT circuit pattern layer disposed on the fourth surface of the second substrate;
   wherein the first TFT circuit pattern layer and the second TFT circuit pattern layer are respectively aligned.

2. The cholesteric liquid crystal display device according to claim 1, wherein the display device further comprises a fourth substrate, a third cholesteric liquid crystal layer, a third common electrode pattern layer, and a third TFT circuit pattern layer, and wherein the fourth substrate comprises a seventh surface and an eighth surface corresponding to the seventh surface, the third cholesteric liquid crystal layer is disposed between the third substrate and the fourth substrate, the third common electrode pattern layer is implemented on the seventh surface of the fourth substrate, and the third TFT circuit pattern layer is implemented on the sixth surface of the third substrate.

3. The cholesteric liquid crystal display device according to claim 2, wherein the display device further comprises a second color filter layer disposed on the third substrate.

4. The cholesteric liquid crystal display device according to claim 2, wherein the display device further comprises a first color filter layer disposed on the second substrate.

5. The cholesteric liquid crystal display device according to claim 1, wherein the display device further comprises a first color filter layer disposed on the second substrate.

6. The cholesteric liquid crystal display device according to claim 1, wherein the display device further comprises a black absorption layer disposed on the first surface of the first substrate.

7. The cholesteric liquid crystal display device according to claim 1, wherein the display device further comprises a first cover layer for covering the first common electrode pattern layer.

8. The cholesteric liquid crystal display device according to claim 1, wherein the display device further comprises a second cover layer for covering the second common electrode pattern layer.

9. The cholesteric liquid crystal display device according to claim 1, wherein the first TFT circuit pattern layer is in direct contact with the third surface of the second substrate.

10. The cholesteric liquid crystal display device according to claim 1, wherein the second TFT circuit pattern layer is in direct contact with the fourth surface of the second substrate.

\* \* \* \* \*